April 4, 1967 A. SHAPIRO ET AL 3,312,383

PLASTIC CONTAINER

Original Filed Oct. 7, 1963

INVENTORS
Arnold Shapiro,
William Hammer + Leo J. Kerivan
BY
Wolf, Greenfield & Hieken
ATTORNEYS

3,312,383
Patented Apr. 4, 1967

3,312,383
PLASTIC CONTAINER
Arnold Shapiro, Chestnut Hill, William Hammer, Lexington, and Leo J. Kerivan, Wellesley, Mass., assignors to Sweetheart Cup Corporation, Cambridge, Mass., a corporation of Maryland
Original application Oct. 7, 1963, Ser. No. 314,362. Divided and this application Oct. 16, 1964, Ser. No. 411,959
5 Claims. (Cl. 229—1.5)

This is a division of application Ser. No. 314,362, filed Oct. 7, 1963.

This invention relates to the manufacture of disposable containers and more particularly comprises a new and improved method of making disposable containers from expansible plastic material.

Disposable plastic containers for food and drink have gained a substantial portion of the market which formerly used only containers made of paper. The greatest inroads made in this market by plastic containers have been in the line of cold food and drink containers, for very economical methods have been developed to draw thin plastic sheets into a variety of container shapes, and the cost of plastic sheet material is economically competitive with the cost of paper. In this special area, the containers made of plastic perform functionally at least as well as those made of paper, and because of the formability of the plastic they may be made in more decorative shapes. However, no economically satisfactory plastic containers have heretofor been devised for hot food and drink. While many functionally satisfactory plastic containers have been made for this purpose, none have been inexpensive enough to gain a significant portion of the market.

While no inexpensive plastic container has heretofor been developed suitable for use with hot food and drink, the search has continued, because it is perfectly apparent to all having even a passing knowledge of the plastics art that a variety of plastics have many of the physical characteristics which make them inherently suited both functionally and artistically for this purpose. Cellular plastic materials such as themoplastic foams are particularly well suited to provide the insulation required of containers for hot foods, and thermoplastic foams formed into a container may have sufficient strength to perform the intended function and withstand the normal abuses to which such containers are subjected. No economical method has heretofor been developed, however, to manufacture them in quantity. For example, the vacuum or pressure forming of foam sheet material is extremely difficult, and the knowledge acquired in the industry through the vacuum and pressure forming of thin-walled containers made of plastic has been of little assistance.

It has been apparent since the development of foam plastic material that good heat insulation may be obtained by providing the container made of that material with thick walls, but thick container walls cause a corresponding increase in the nesting height of a stack of such containers. It is essential that nesting height be small to achieve low shipping costs and large capacity per unit volume in such equipment as vending machines where such containers are used.

The primary object of this invention is to provide an economical method of mass producing throw-away plastic containers suitable for hot food and drink.

Another important object of this invention is to provide a container made of foamed plastic, having good heat insulating and strength properties and a limited thickness.

Another important object of this invention is to provide a disposable container having side walls which have good heat insulating properties and a normal upward and outward flare, and which stack in a low nest.

In accordance with this invention side and bottom wall blanks are cut from expansible thermoplastic sheet material, and the container is formed by chemically welding the blanks together. After the blanks are chemically welded to complete the formation of the container, the side wall of the container is simultaneously subjected to internal expanding forces and external forces which limit the expansion of the side walls, so as to establish a density gradient across the walls. While the core of the wall material is made less dense, the surface regions of the walls are made more dense. Consequently, the core of the side wall provides the necessary heat insulation for the container while the outer surfaces of the wall provide the necessary strength. This action also provides the surfaces of the side walls with a satin-like finish which is extremely attractive, smooth and suitable for printing.

These and other objects and features of this invention along with its incident advantages, will be better understood and appreciated from the following detailed description of several embodiments thereof, selected for purposes of illustration and shown in the accompanying drawing, in which.

The method of this invention will be described in connection with the manufacture of drinking cups, but it is to be understood that the invention is not in any way confined to the fabrication of those specific articles.

Figure 1:
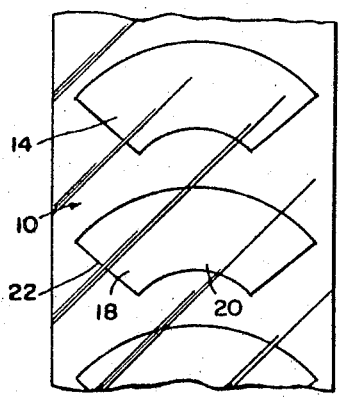
FIG. 1 is a fragmentary plan view of a strip of expansible plastic sheet material suggesting how the side wall blanks of cups may be cut.
Figure 2:
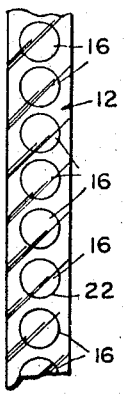
FIG. 2 is a fragmentary plan view of another strip of expansible plastic sheet material suggesting how the bottom wall blanks of the cups may be cut.
Figure 3:
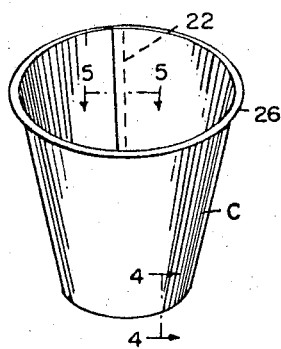
FIG. 3 is a perspective view of a cup made from the blanks.

In FIGS. 1 and 2, strips of heat expansible thermoplastic material 10 and 12 are shown from which blanks 14 and 16 are punched or otherwise formed, which blanks make up the side and bottom walls respectively of the cup shown in FIGURE 3. The strip material 10 and 12 is preferably formed by extrusion from thermoplastic polystyrene beads or pellet material or the like known commercially by such trademarks as "Dylite," manufactured by Koppers Company and "Pellospan," manufactured by Dow Chemical Corp. The beads or pellets when heated to fusible temperatures individually expand and unite with each other to form a contiguous rigid unicellular structure. When extruded in sheet form the sheet may again be rendered thermoplastic at which time the material again expands.

Figure 4:
FIGS. 4 and 5 are fragmentary cross-sectional views taken along the corresponding section lines in FIG. 3.
Figure 5:

The blanks 14 and 16 provided to form the side and bottom walls of the cup are of conventional form as extensively used in the paper industry. In accordance with the present invention the side and bottom edges 18 and 20 of the blanks 14 are coated with a material which stimulates the chemical welding of the vertical seam 22 of the side wall and the junction of the margin 23 of the bottom wall blank 16 and the edge 20 of the blank 14 in the manner shown in FIGS. 4 and 5. The particular apparatus for carrying out the blanking of the sheets 10 and 12, the application of the chemical to the margins 18 and 20 and the forming of the cup from the blanks 14 and 16, form no part of the present invention. The method and machinery employed in these first steps of the fabrication of the cup may follow the procedures and be practiced on the equipment found in the paper industry.

After the cup is formed as shown in FIG. 3 with a permanent weld along the seams 22 and 24, the cup may have the appearance of a stock paper cup, even including the bead 26 formed about its mouth. In accordance with the present invention, only after cup has been formed into the shape shown in FIG. 3, is it subjected to the additional steps which create an article having the special characteristics referred to above, making it suitable for hot drinks.

One of the problems inherent in the use of a foamed material is the lack of strength of such material, particularly in relatively thin sections. Another disadvantage of this material is the irregular textured character of the surfaces of such material. Because surfaces are not uniform, containers made from the material lack the richness in appearance of paper containers for the same use, and can in certain instances appear to be unfinished. Further, while the foam material inherently has good heat insulating properties, in thin sections the insulation is not sufficient to allow a container made of that material to be handled comfortably when filled with hot liquid.

In order to increase the strength and heat insulating properties of the material and enhance its appearance by giving it a smooth satin-like finish, additional steps are conducted in the manufacturing process. In accordance with beam theory, the work performed by a unit of cross section of the beam is proportional to the third power of the distance of that unit cross section from the beam center. That is, under an applied load the greatest stresses are borne at the surface regions of the beam, and those stresses diminish toward the center of the beam. Because the surface regions of the beam are required to perform the greatest amount of work, it is advantageous in some way to increase the mass of the surfaces; hence, the development of I-beams. This same theory suggests the benefits which may be derived by increasing the strength of the foam material at the surface regions.

Prior to this invention it has been the practice when desiring increased strength from a particular piece of foamed plastic to achieve the added strength by expanding the material to increase its thickness. While in many applications this is the easiest and the most practical way of acquiring the needed strength, in the container art there are many disadvantages acquired by increasing the thickness of the container walls. As suggested in the introduction, nesting height is always a consideration in the manufacture of disposable containers, as the nesting height of a stack of containers affects both the shipping costs and the cost of servicing vending machines in which such containers are used. The nesting height of containers is a direct function of the thickness of the container walls, and the only way to compensate for excessive wall thicknesses is to increase the upward and outward flare of the side walls, which has obvious limitations. It is therefore essential to maintain the wall thickness at a minimum to produce a wholly acceptable product.

Figure 7:
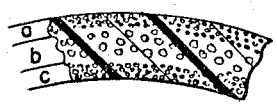
FIG. 7 is an enlarged fragmentary cross-sectional view suggesting the density gradient established in the wall of the cup after treatment in accordance with FIG. 6.

Because the wall thickness of the container cannot be increased without adversely affecting the stacking height, the necessary strength is acquired by increasing the strength of the surface zones of the wall material. In FIG. 7 this is suggested wherein a cross section of the material is shown after treatment. In that figure the surface zones $a$ and $c$ of the wall are shown to be relatively dense as compared to the interior zone $b$. The density gradient established across the section of the wall provides added strength at the zones $a$ and $c$, incidently smooths the surfaces to give the wall a finished appearance, and increases the heat insulation properties of the wall by the substantial reduction in the density of the wall at the interior zone $b$.

Figure 6:
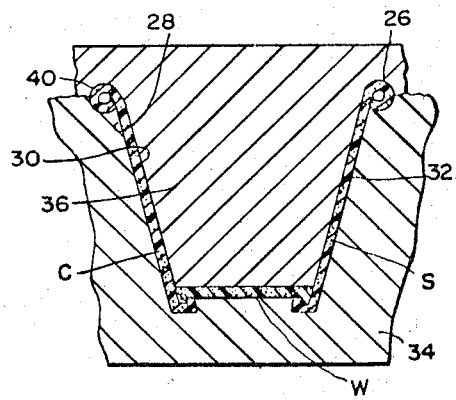
FIG. 6 is a diagrammatic view illustrating the treatment of the cup of FIG. 3 after it is formed from the blanks.

To achieve the density gradient shown in FIG. 7 the fully formed container of FIG. 3 is placed in the cavity 32 of female die 34, and male die 36 is inserted into the container as shown in FIG. 6. When the dies are closed about the cup C, the surface of cavity 32 bears against the outer surface 28 of the side wall of cup C and preferably the surface of the male die 36 bears against the inner surface 30 of the side wall. Similarly the outer and inner surfaces of the bottom wall W of the cup C are engaged by the bottom surfaces of the male and female dies. The male and female dies prevent any increase in the cross-sectional thickness of the walls of the container but do not in any way inhibit the establishment of a density gradient throughout the cross section. While the dies act upon the container walls to prevent changes in wall thickness, heat is applied to those walls by any one of several different ways, which heat would ordinarily cause the walls to expand. This heat applied to the side wall S and the bottom wall W of the cup C causes the gasses in the cells of the foam to expand in the interior zone $b$ and displace in the directions of the surfaces 28 and 30. As those surfaces cannot themselves move, the density of the material builds up in the surface zones $a$ and $c$ to achieve the gradient illustrated. It is important to note that the step of heating the cup in the dies 34 and 36 to achieve the density gradient through the container walls does not in any way adversely affect the seams chemically welded together before the cup was placed in the mold.

It has been suggested that the heating may be achieved by a number of different ways. For example, infrared heaters may be imbedded in the male and/or female die to direct heat to the walls of the cup. Alternatively, steam passages may be provided in one and/or the other of the molds to direct steam through the walls S and W to achieve the desired results. As yet another alternative, dielectric heaters may be imbedded in the molds to electronically heat the thermoplastic material.

After the heating is completed and the density gradient is achieved the cup C should be cooled in some way before opening the dies. Cooling of the thermoplastic material will cause the walls to harden so that they may be removed from the cavity 32 without deformation or subsequent expansion. Like the heating step, cooling may be achieved in a number of ways such as by directing cooling water or forced air over or through the dies or by ambient cooling. When cooled, the dies may be opened and the cup C may be removed.

In FIG. 6 the two dies are shown to define a bead-shaped cavity 40 which receives the rim 26 of the cup. It will be appreciated that if the bead-shaped cavity 40 is larger than the overturned rim 26, the heat applied to the material may cause the rim to expand and acquire the cavity shape. This same phenomenon may be employed to specially shape certain parts of the side wall S of the cup or achieve special textures other than that of a smooth polished satin-like finish. Further, a cover seat may be provided at the top of the side wall S on its interior surface by providing an annular bead-shaped cavity in the male probe 36, which will cause a portion of the inner surfaces of the side wall S to expand. Such shapes may readily be achieved merely by specially shaping the male and/or female dies.

In the foregoing description it has been suggested that both the side wall S and the bottom wall W be shaped from blanks in turn cut from expansible thermoplastic sheet material. It may be desirable for certain uses to have a side wall S made of the thermoplastic material but provide the container with a bottom wall W of paper, noncellular plastic, a paper-plastic laminate or yet some other material. This change is contemplated within the scope of this invention. The density gradient may be confined to the side wall or even to but a portion thereof and the desired reseults may be achieved.

In accordance with the present invention the thickness of the wall or walls of the container does not appreciably change. Thus, while some expansion may be permitted by providing a cavity between the male and female dies which somewhat exceeds the blank thicknesses, nevertheless to achieve the density gradient substantial restraint must be exerted upon the walls to severely limit their expansion. This feature is contrary to the teachings of the prior art wherein expansion is relied upon to achieve the increased strength and heat insulation. Thus, typically the thickness of the expansible thermoplastic sheet material may be 0.030″, and after heating to achieve the density gradient, the wall thickness may be 0.040″. This growth will not appreciably impair the formation of the dense surface zones, but a wall growth of 2 or 3 times its original thickness will severely impair the formation of the dense surface zones and the heat insulating interior zone $b$.

Figure 8:
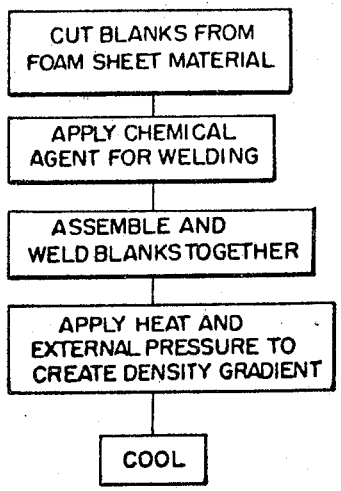
FIG. 8 is a box diagram suggesting the steps of the method of this invention.

In accordance with the present invention, the seams 22 and 24 are chemically welded to form a permanent bond before the application of heat, shown as the fourth step in the box diagram of FIG. 8. If the expansible materials used are "Dylite" or "Pellospan," a solvent of the material may be used to provide an instantaneous bond, and no waiting period is required before placing the chemically welded container in the cavity of the female die. The adequacy of the chemical welds is not dependent upon the application of heat, and thus while the heat may enhance the bond it is not required for a satisfactory result. Thus, if the equipment employed may better be utilized by shaping and chemically welding the container parts together at one location and at another location and/or at a later time by applying the heat to achieve the density gradient in the walls, this procedure may be adopted without any ill effects.

While in the embodiment described above the density gradient is achieved by limiting the overall expansion of the material while applying an expanding agent such as heat to the wall, in accordance with this invention the density gradient may be achieved in other ways. In other embodiments the growth of the material is not inhibited but rather, after the growth occurs the material is returned to substantially its initial thickness by subjecting it to compressive forces. Thus, the formed container of FIG. 3 may be heated, which causes it to expand several times its initial thickness, and after the expansion occurs, the side wall of the container may be compressed. Compressive forces applied to the inner and outer surfaces of the side wall create a density gradient through the side wall cross section as shown in FIG. 7. Thus, high strength regions are formed at the surface zones and good heat insulating properties are created in the interior zone of the material.

In accordance with yet another embodiment of this invention the cup of FIG 3 may be passed through boiling water which will cause the plastic material to expand several times its initial thickness, if unrestrained. Subsequently the expanded walls of the container may be compressed in the manner described above to achieve the density gradient.

In yet another embodiment of this invention the container of FIG. 3 may be formed of a fully expanded material. That is, the sheets 10 and 12 may be fully expanded foam, and the blanks 14 and 16 cut from it may have a thickness .060″ or more. After the blanks are cut the solvent may be applied to the edges 18 and 20 of the side wall blank, and through the normal forming operations the cup of FIG. 3 may be constructed. After the cup is fully formed as shown in FIG. 3, its walls and particularly the side wall of the container may be compressed to create the density gradient shown in FIG. 7.

The expansible materials such as "Dylite" and "Pellospan" suggested as suitable materials for the practice of this invention normally have a density of approximately 5 to 6 pounds per cubic foot, and the extrusion process by which the sheets are formed create a very thin skin on the surfaces which have a density of approximately twice or three times the normal sheet density. This normal skin is not to be confused with the high density surface zones created by this invention. Whatever the skin density of the sheets before treatment, that density increases and may approach or even achieve the density of straight polystyrene, which is approximately 64 pounds per cubic foot.

From the foregoing description those skilled in the art will appreciate that numerous modifications may be made of this invention without departing from its spirit. Therefore, it is not intended to limit the breadth of this invention to the single embodiment illustrated and described. Rather, it is intended that the scope of this invention be limited by the appended claims and their equivalents.

What is claimed is:

1. A disposable plastic foam hot drink cup comprising
an upwardly and outwardly flared side wall .030–.040 inch in thickness made solely of a foam sheet plastic material and having a compressed welded lapped seam and with the thickness of the wall at the seam being substantially identical to the thickness of the remainder of the side wall,
an overturned rim formed at the top of said side wall,
surface zones provided in the side wall of substantially greater density than the interior zone,
and a bottom wall welded to the side wall, said bottom wall being made of sheet material.

2. A disposable plastic foam cup comprising
an upwardly and outwardly flared side wall made solely of foam sheet plastic material and having a compressed, lapped side seam, the thickness of the wall at the seam being substantially equal to the final thickness of the sheet plastic material in the remainder of the side wall,
an overturned rim formed at the top of said side wall,
surface zones provided in the wall having a density substantially greater than the interior zone of the material, said interior zone being of substantially the same density as the density of the interior of the original sheet,
and a bottom wall joined to the side wall and made of a sheet material.

3. A disposable plastic container as defined in claim 2 further characterized by
said side seam being chemically welded together and said surface zones being of substantially equal thickness.

4. A disposable plastic container as defined in claim 2 further characterized by
the bottom edge of the side wall being folded upwardly and inwardly and providing an upwardly open seat,
said bottom wall having a down turned edge disposed in the seat, and a central portion disposed above the bottom edge of the side wall,
and a weld joining the edge of the bottom wall and the margins of the seat.

5. A disposable plastic foam container as defined in claim 2 further characterized by said surface zones being of substantially equal thickness.

References Cited by the Examiner

UNITED STATES PATENTS

| | | | |
|---|---|---|---|
| 2,152,323 | 3/1939 | Moore. | |
| 2,737,503 | 3/1956 | Sprague. | |
| 2,917,217 | 12/1959 | Sisson | 229—3.5 X |
| 3,049,277 | 8/1962 | Shappell | 229—1 |
| 3,141,595 | 7/1964 | Edwards | 229—1.5 |
| 3,189,243 | 6/1965 | Lux | 229—3.5 |
| 3,215,300 | 11/1965 | Lynch | 229—2 X |

GEORGE O. RALSTON, *Primary Examiner.*